Nov. 20, 1934.  M. M. USADEL  1,981,763
TIRE CHANGING DEVICE
Filed Oct. 19, 1933    2 Sheets-Sheet 1
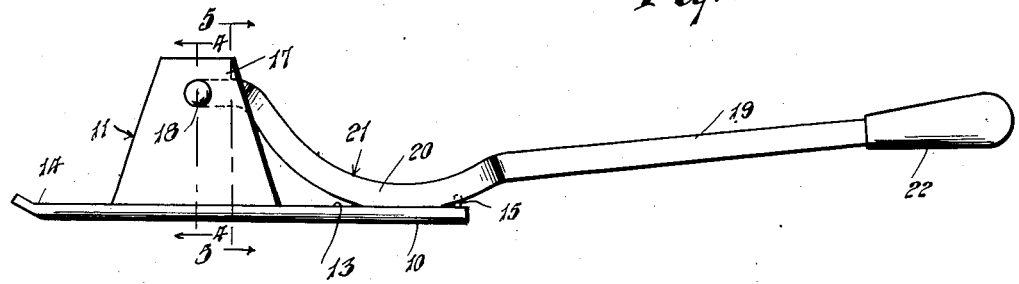
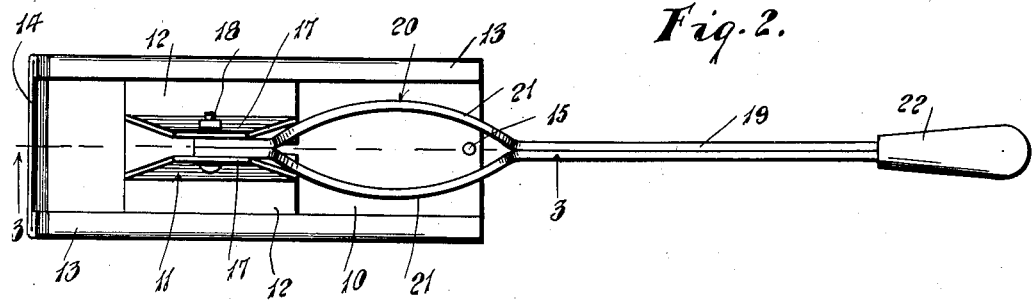
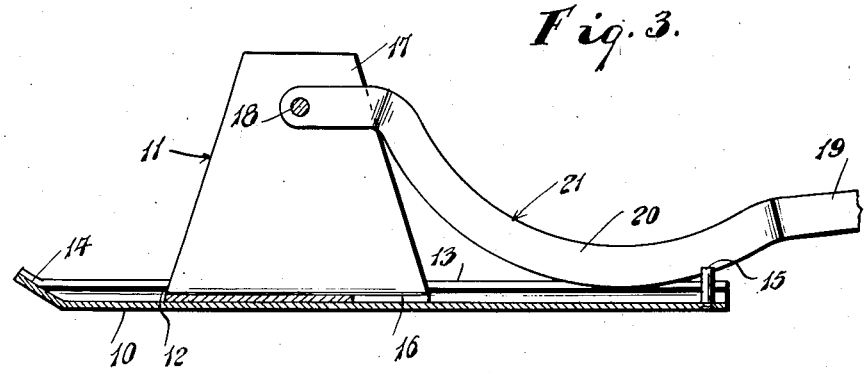
Inventor
Mary M. Usadel.

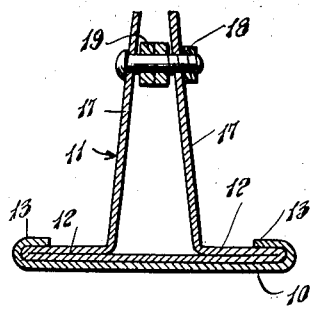
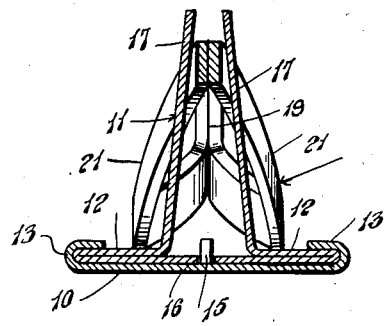
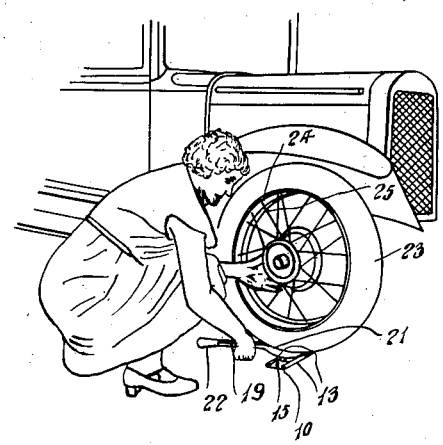
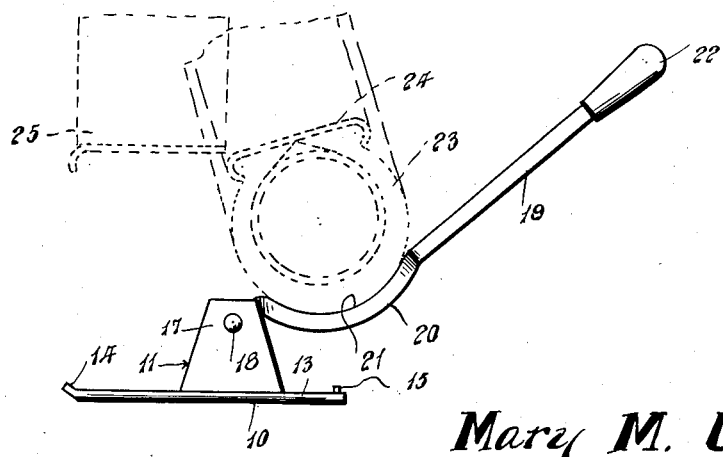

Patented Nov. 20, 1934

1,981,763

UNITED STATES PATENT OFFICE 1,981,763

TIRE CHANGING DEVICE

Mary M. Usadel, Merrill, Wis.

Application October 19, 1933, Serial No. 694,333

3 Claims. (Cl. 254—131)

This invention relates to a device to facilitate the removal and replacement of tires, rims and wheels particularly of self-propelled vehicles.

An important object is to provide a lifting member or lever having a depressed portion for engagement and coaction with the tire.

Another prime aim is to provide a means to which said lever or equivalent is pivoted and which means is capable of movement relatively to a base or support to facilitate the tire changing operation.

The more specific objects and advantages will become apparent from a consideration of the description following taken in connection with accompanying drawings illustrating an operative embodiment.

In said drawings:—

Figure 1 is a side elevation of the improved device,

Figure 2 is a plan view of the device,

Figure 3 is an enlarged longitudinal sectional view taken on the line 3—3 of Figure 2, Figure 4 is an enlarged sectional view taken on the line 4—4 of Figure 1, Figure 5 is an enlarged sectional view taken on the line 5—5 of Figure 1, Figure 6 is a perspective view suggesting the use of the device, and Figure 7 is a side elevation of the device as used for applying a tire and rim to a wheel.

Referring specifically to the drawings wherein like reference characters designate like or similar parts, 10 designates a base or support adapted to rest directly on the ground or floor and is of a suitable area so that the device will be stable in use. Slidable longitudinally of the base or support 10 is a standard or bracket 11 which has laterally extending runners 12 overlapped by flanges 13 along the longitudinal marginal edges of said base. One end of the base 10 is upturned as at 14 to prevent detachment of the bracket 11 through movement in one direction. At the other end of the base, a pin 15 is provided to limit the movement of the bracket, the bracket having a slot 16 adapted to receive the pin so as to afford a greater stroke for the bracket. Said bracket also has arms 17 to which a bolt or pivot member 18 is detachably fastened. A tire-engaging lever 19 is pivoted on bolt 18. Lever 19 is preferably made from a single piece or strap of material doubled upon itself as shown and transversely separated and bowed as at 20. The bowed portion or portions 20 are also depressed or concaved as at 21, in order to substantially conform to the transverse curvature of tires. A handle 22, of wood or any desired material is secured to the operating end of lever 19.

Aside from said handle 22 all of the parts described are preferably made from a suitable metal, although any sufficiently strong material will suffice.

The use of the tool is suggested in Figures 6 and 7. The tool or device may be used for removing tires and their rims or the equivalent or for replacing tires and their rims or equivalent. In removing a tire 23 and rim 24, from a wheel 25, the wheel is first jacked up whereupon the device is positioned with the lever 19 disposed under the tire. Lever 19 is then raised so that the portion 21 engages the tire and thereupon the lever 19 is pulled toward the operator, the tire being stripped or removed from the wheel 25 since the bracket 11 will slide along the base 10.

Should the operation be that of lifting a tire and rim 23 and 24 onto a wheel 25, the device is positioned as shown in Figures 6 and 7 and the lever lifted so that the tire is engaged at the depressed portion 21, the lever being further lifted until the rim 24 and tire 23 are moved onto the wheel 25.

Various changes may be resorted to provided they fall within the spirit and scope of the invention.

I claim as my invention:

1. A device of the class described comprising a support, means slidably mounting said support, a lifting member pivoted at one end to said support, and said lifting member having a depression between its pivotal axis and other end for engagement with a tire.

2. A device of the class described comprising a base, a bracket slidable along said base, and a lifting lever pivoted at one end to said bracket, having a depression between its pivotal axis and other end engageable with a tire or the like.

3. A device of the class described comprising a base, a bracket slidable along said base having runners, flanges on the base overlapping the runners, said base being upturned at one end to limit movement of the bracket in one direction, means on the base to limit movement of the bracket in the other direction, said bracket having a slot to receive said means, a lifting lever pivoted at one end to the bracket, and said lifting lever having a depression between the pivotal axis and other end for engagement with a tire.

MARY M. USADEL.